W. ROSE.
CLUTCH AND BRAKE.
APPLICATION FILED MAR. 19, 1910.
1,067,197.
Patented July 8, 1913.
5 SHEETS—SHEET 2.
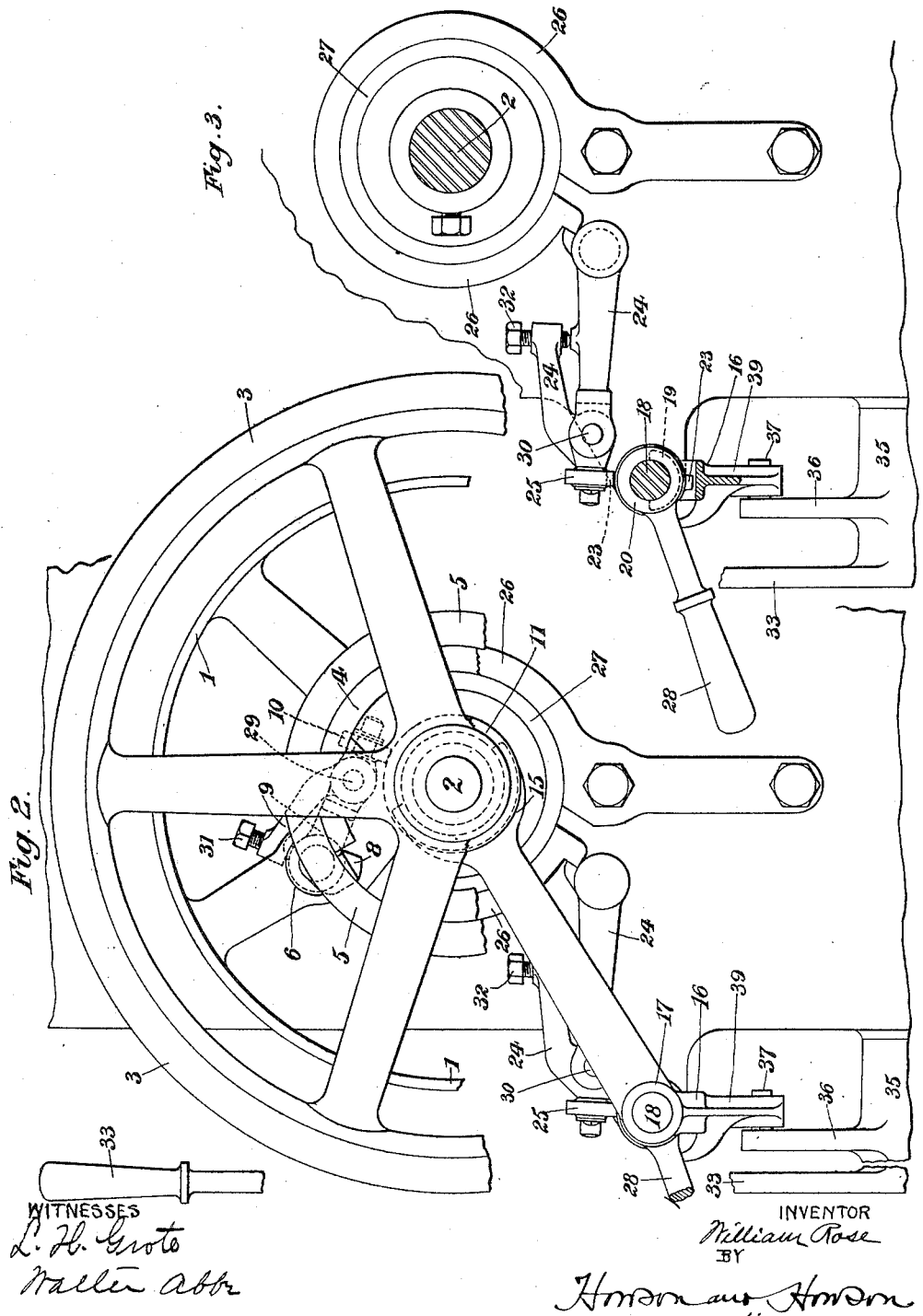

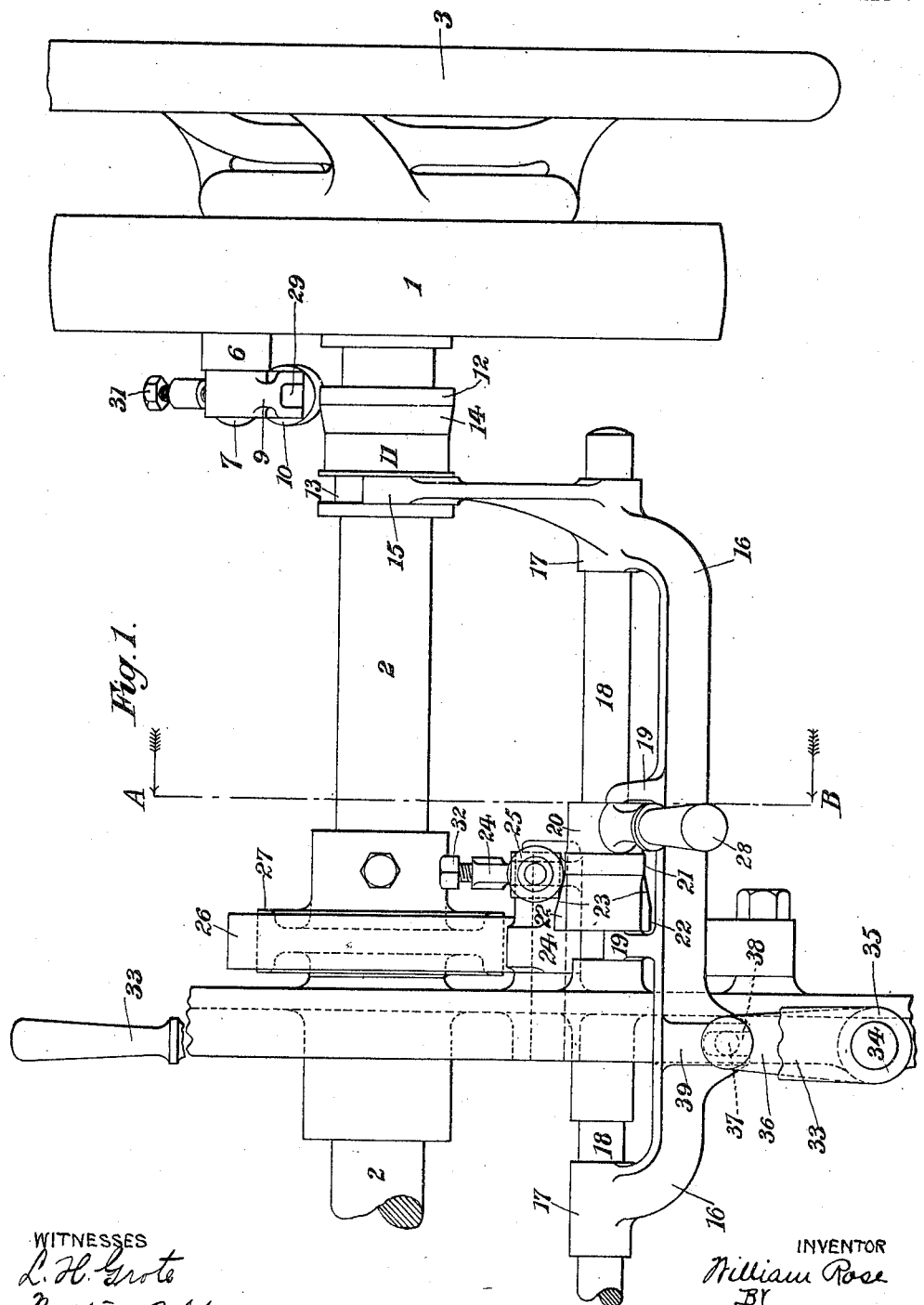

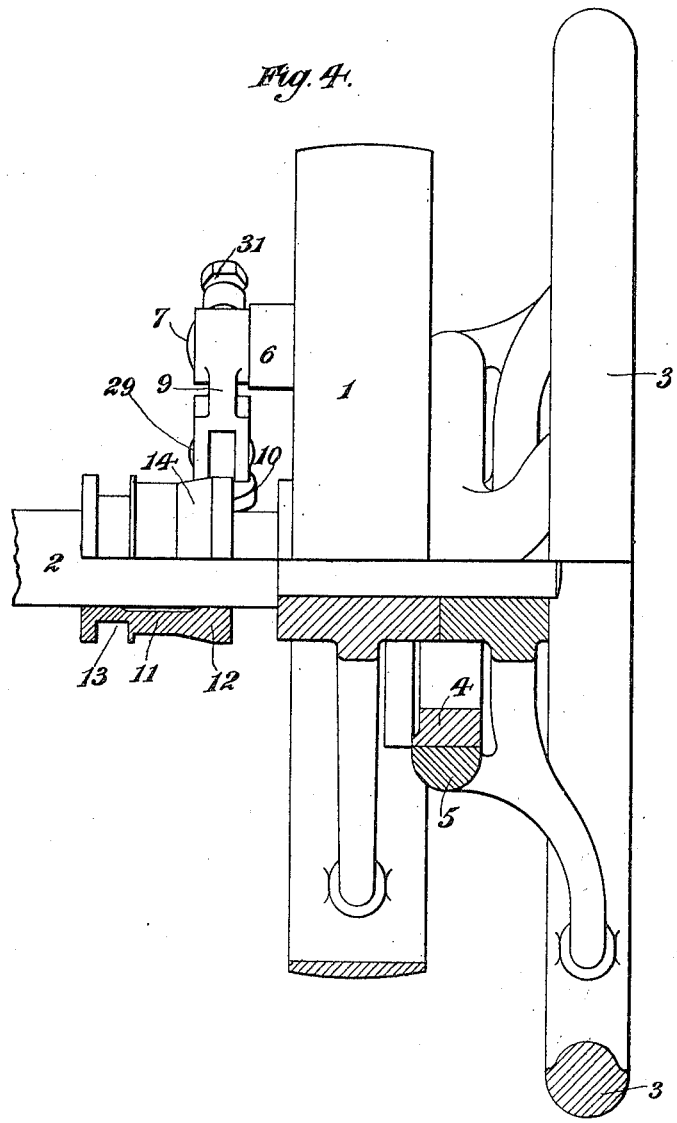

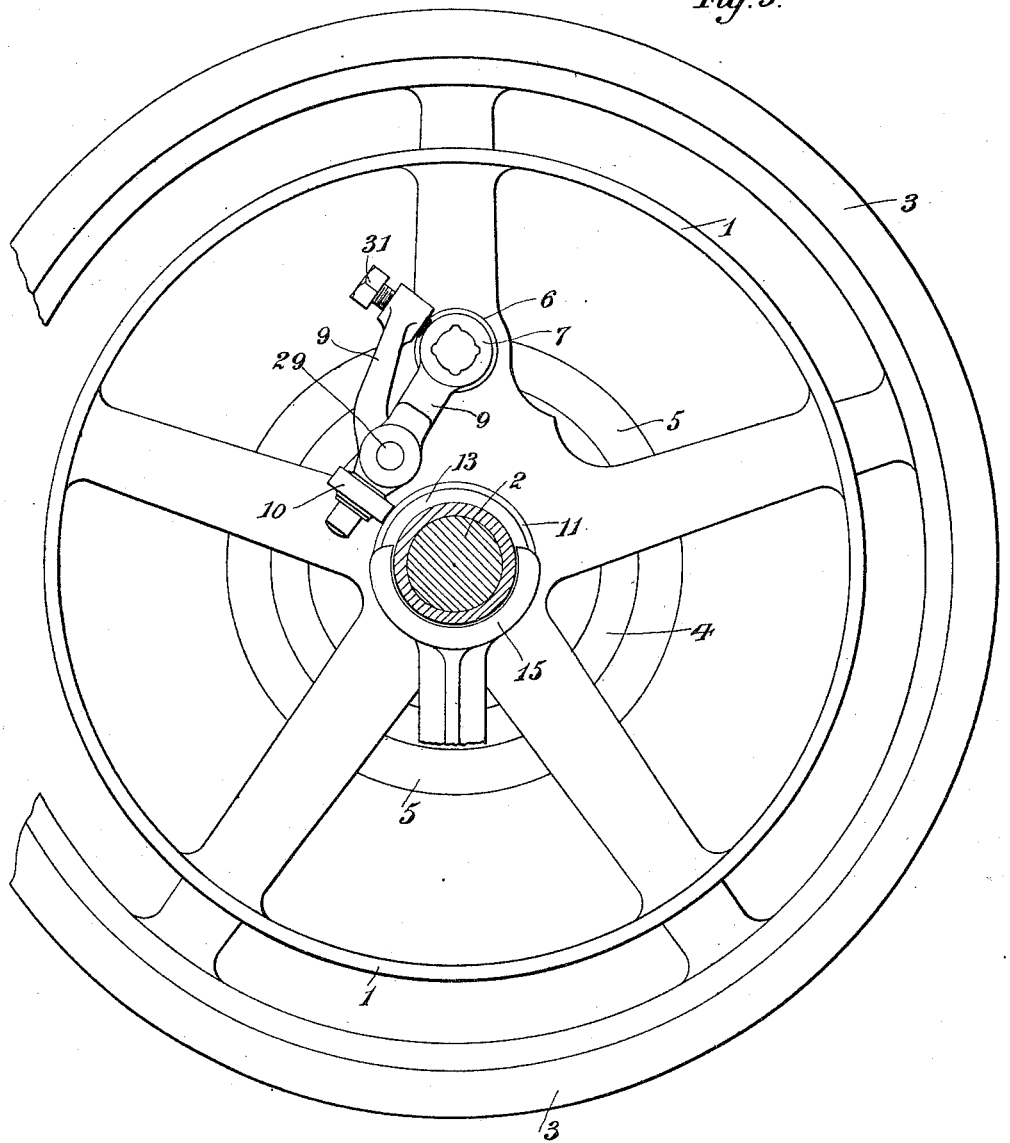

W. ROSE.
CLUTCH AND BRAKE.
APPLICATION FILED MAR. 19, 1910.

1,067,197.

Patented July 8, 1913.
5 SHEETS—SHEET 5.

WITNESSES
L. H. Grote
Willis Abby

INVENTOR
William Rose
BY
Howson and Howson
his ATTORNEYS

UNITED STATES PATENT OFFICE.

WILLIAM ROSE, OF GAINSBOROUGH, ENGLAND.

CLUTCH AND BRAKE.

1,067,197.  Specification of Letters Patent.  Patented July 8, 1913.

Application filed March 19, 1910.  Serial No. 550,519.

*To all whom it may concern:*

Be it known that I, WILLIAM ROSE, a subject of the King of Great Britain and Ireland, of Albion Works, Gainsborough, in the county of Lincoln, England, have invented a new and useful Improved Clutch and Brake, of which the following is a specification.

The principal object of this invention is to provide a simple and efficient arrangement of combined clutch and brake which can be actuated by the same initial operative means, movement in one direction putting the clutch into engagement while the brake is off, or at the same time removing the brake should it not have been removed by the hand lever provided for the purpose and movement in the other direction putting on the brake while the clutch is being disengaged, the apparatus to which the combination is applied being capable of being operated by hand, if required, when the operative means is in such a position that the clutch is disengaged and the brake is off.

I will describe this invention with reference to the accompanying drawings, in which—

Figure 7:
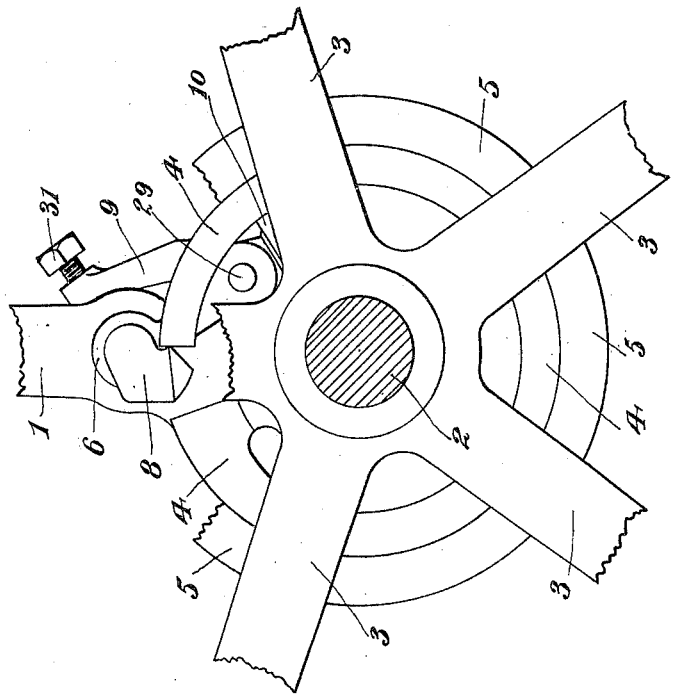
Figure 6:
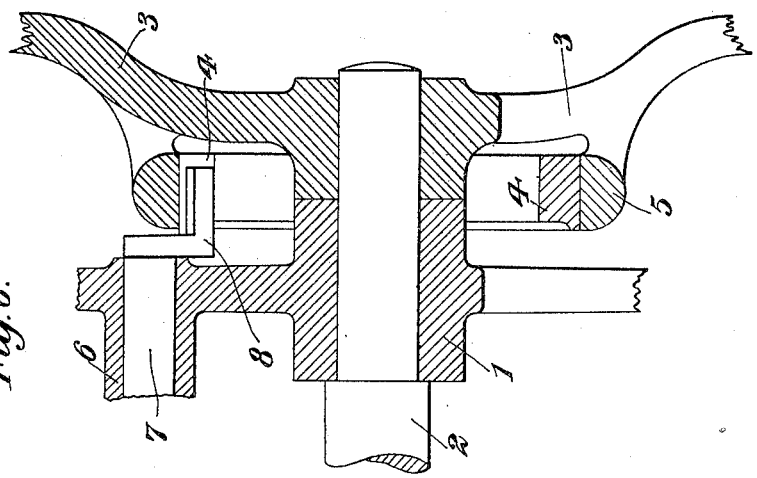

Figure 1 shows in side elevation and Fig. 2 in end elevation, with parts broken away, an arrangement of combined clutch and brake constructed in accordance with this invention. Fig. 3 is a transverse section taken on the line A B of Fig. 1. Figs. 4 and 5 are views (partly in section) at right angles to each other showing the clutch portion. Fig. 6 is a sectional elevation and Fig. 7 an end elevation, with part broken away, showing more clearly the clutch engaging means.

The pulley 1, through which the apparatus is driven by a belt, or other gear, is loosely mounted on the main shaft 2. At the side of this pulley 1 is a hand-wheel 3, or other wheel, (I will refer to it as a hand-wheel) secured to the main shaft 2. A transversely severed and consequently expansible ring 4 is secured at one end to the pulley 1 and is situated within a circular rim, wheel, or the equivalent, 5, secured to, or in connection with, the shaft, which is shown as being a rim formed on the hand-wheel 3, so that, when extended, the said ring 4 bears against the internal periphery of the said rim 5. Through a bearing 6 in the pulley 1 passes a short shaft, or stud, 7 parallel with the main shaft 2, this short shaft, or stud, 7 carrying, at one end, a cranked projection 8 for bearing on the free end of the expansible ring 4, to cause it to clutch the rim on the hand-wheel 3, the other end of the said short shaft, or stud, 7 carrying a lever 9, carrying the antifriction roller 10 which bears on a collar 11 capable of rotating with, and sliding upon, the main shaft 2, the said collar 11 having a grooved part 13, a plain part 12 of larger diameter, and a coned part 14, between the parts 11 and 12, which coned part 14, when the collar 11 is moved lengthwise (toward the left hand in Fig. 4), will act on the end of the lever 9 and tilt it so as to turn the aforesaid short shaft, or stud, 7 and cranked part 8 and expand the clutch ring 4 and so engage the driving pulley 1 and hand-wheel 3 and drive the main shaft 2. The said collar 11 is shifted lengthwise by means of a fork 15 engaging with the grooved part 13 of the aforesaid collar 11 and carried by a bar 16 which is formed with eyes 17 to slide upon a fixed guide-rod 18, the said bar 16 also carrying a fork 19 for acting on a collar 21 with an inclined projection 23 extending from the part 21 to the part 22, so that, when the bar 16 is shifted lengthwise, in a direction which disengages the clutch (that is toward the right hand in Fig. 1), the antifriction roller 25 on the lever 24 is actuated by the inclined projection 23 and forced from the part 21 of lesser diameter to the part 22, at a greater elevation, to apply a brake-strap 26 to a brake pulley 27, or the equivalent, on the main shaft 2.

When the main shaft 2 is to be driven by hand, the aforesaid collar 21 can, by lifting the lever 28 (secured by its boss 20 to the said collar 21) be moved through a partial rotation, so that the antifriction roller 25 at the end of the lever 24, which applies the brake, takes up a position on the said collar 21 at one side of the inclined projection 23 and the brake is released, so that the main shaft 2 is free to be turned by hand. When the bar 16 is moved to engage the clutch, and the inclined projection 23 on the collar 21 has passed beyond the lever 24 which operates the brake, the handle 28 will descend and the said collar 21 will be turned so that the end of the said lever 24 will take up a position on the part 21 of lesser diameter ready to be operated upon by the inclined projection 23 on the said collar when the bar 16 is next shifted into the position to apply the brake. The levers 9 and 24 which bear (through the intervention of their anti-friction rollers) on the aforesaid two collars 11 and 21 to engage the clutch and apply the brake respectively, may, for adjustment, or to compensate for wear, be made in two parts hinged together (as shown at 29 and 30), the roller being carried by one part and the two parts being relatively adjustable by means of a set-screw (31 and 32) so as to alter the position of the roller constituting the end of the levers 9, or the lever 24.

Any convenient means may be employed to slide the bar 16 on the guide rod 18, for example as shown in Figs. 1 and 2, it may consist of a hand-lever 33 centered on a stud 34 on the frame of the machine, the boss 35 of the said hand-lever 33 carrying an arm 36 provided with a pin 37 engaging a slot 38 in a projection 39 from the said bar 16.

What I claim is:—

1. A combined clutch and brake mechanism comprising on a common shaft, a braking band and a clutch band, in combination with means for simultaneously engaging the clutch and freeing the brake, said means comprising an actuating slide rod and operative connections between the same and said brake and clutch mechanisms, one of said connections comprising a cam member, together with means for shifting said cam member to inoperative position, substantially as described.

2. A combined clutch and brake mechanism comprising on a common shaft, a braking band and a clutch band, in combination with means for simultaneously engaging the clutch and freeing the brake, said means comprising an actuating slide rod and operative connections between the same and said brake and clutch mechanisms, one of said connections comprising a cam member, together with means for shifting said cam member to inoperative position, together with means for automatically returning said cam member to operative position upon the shifting of the slide rod, substantially as described.

3. In a combined clutch and brake, a bracket carrying a clutch operating fork and a brake operating fork, a supporting rod upon which said bracket slides, a cam member rotatable and slidable upon said rod and engaged by the brake fork, a brake lever bearing against said cam and a handle for said cam member by which the latter may be rotated on said rod so as to bring its cam face out of engagement with the brake lever, substantially as described.

In testimony whereof I have signed my name to this specification, in the presence of two subscribing witnesses.

WILLIAM ROSE.

Witnesses:
H. D. JAMESON,
V. SIARDELLI.

Copies of this patent may be obtained for five cents each, by addressing the "Commissioner of Patents, Washington, D. C."